June 19, 1934.  C. A. FUCHS  1,963,126
MOLD FOR PRODUCING TYPE CARRIERS OR SHUTTLES FOR TYPEWRITING MACHINES
Filed Oct. 2, 1931  7 Sheets-Sheet 1
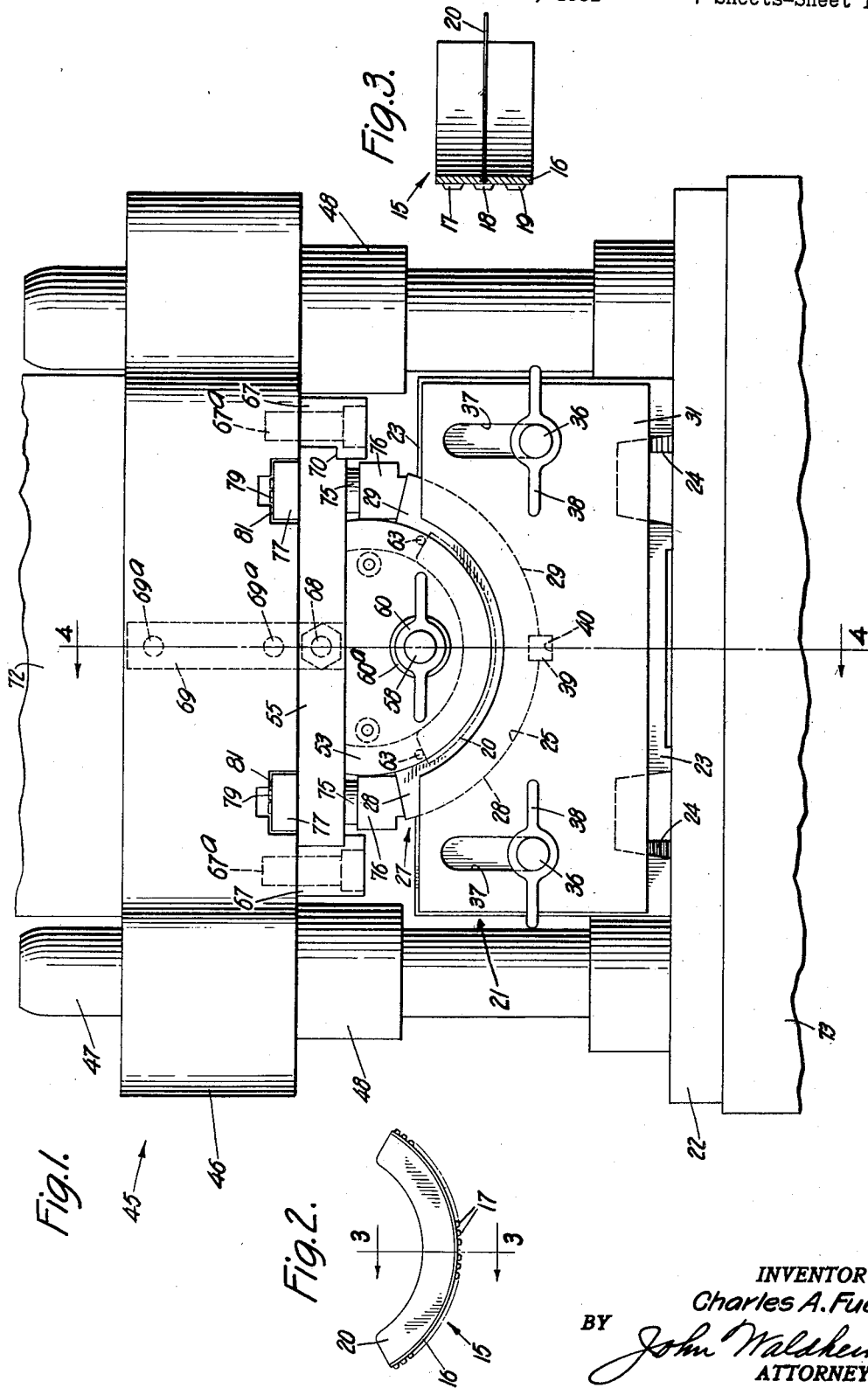
INVENTOR
Charles A. Fuchs.
BY John Waldheim
ATTORNEY June 19, 1934.  C. A. FUCHS  1,963,126
MOLD FOR PRODUCING TYPE CARRIERS OR SHUTTLES FOR TYPEWRITING MACHINES
Filed Oct. 2, 1931      7 Sheets-Sheet 2
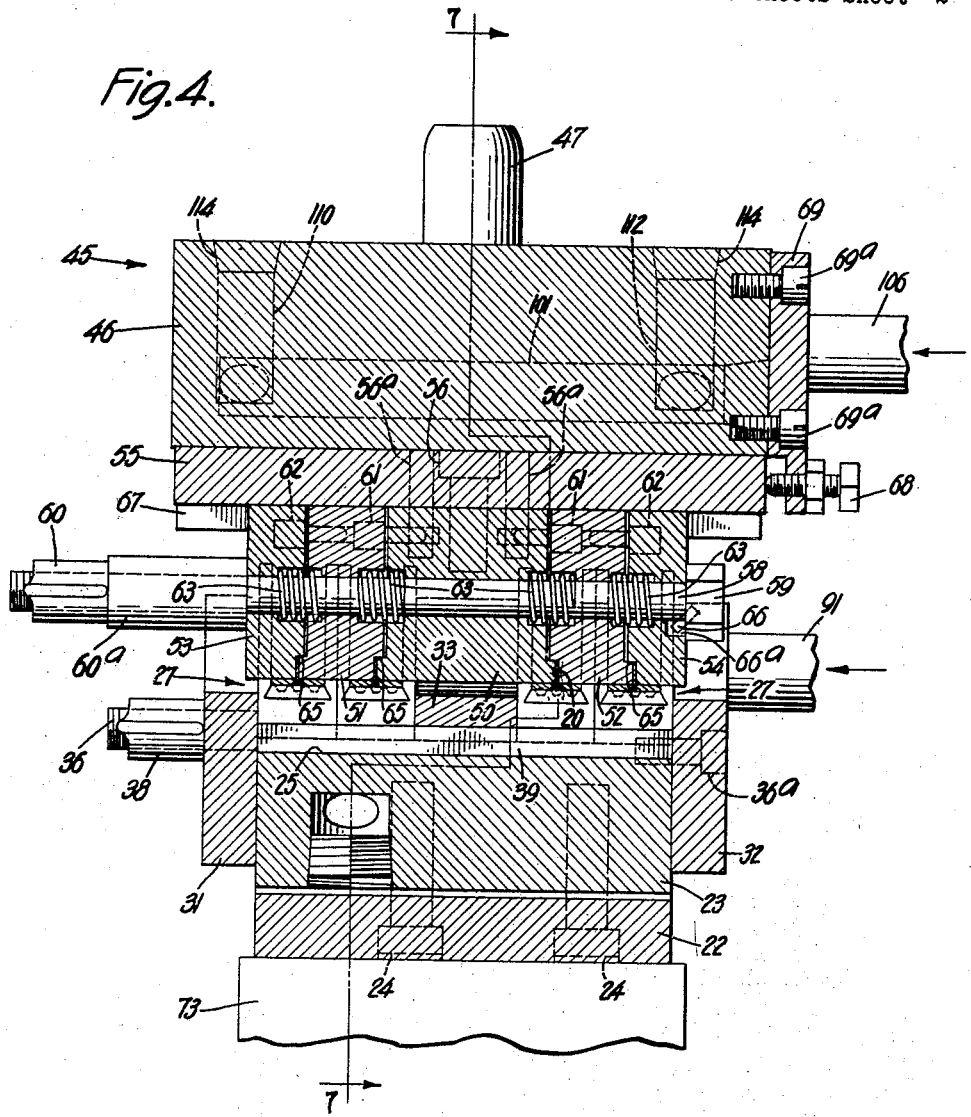
Fig.4.
Fig.5.
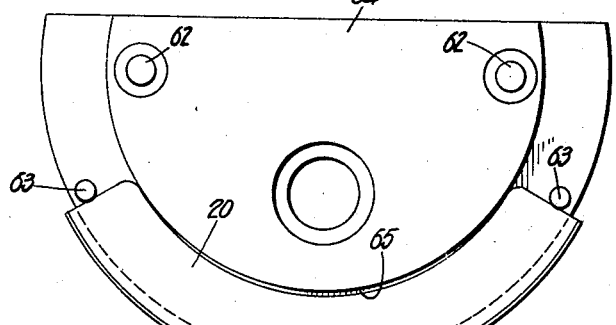
INVENTOR
Charles A. Fuchs.
BY
John Waldheim
ATTORNEY June 19, 1934.  C. A. FUCHS  1,963,126
MOLD FOR PRODUCING TYPE CARRIERS OR SHUTTLES FOR TYPEWRITING MACHINES
Filed Oct. 2, 1931  7 Sheets-Sheet 5

INVENTOR
Charles A. Fuchs.
BY John Waldheim
ATTORNEY

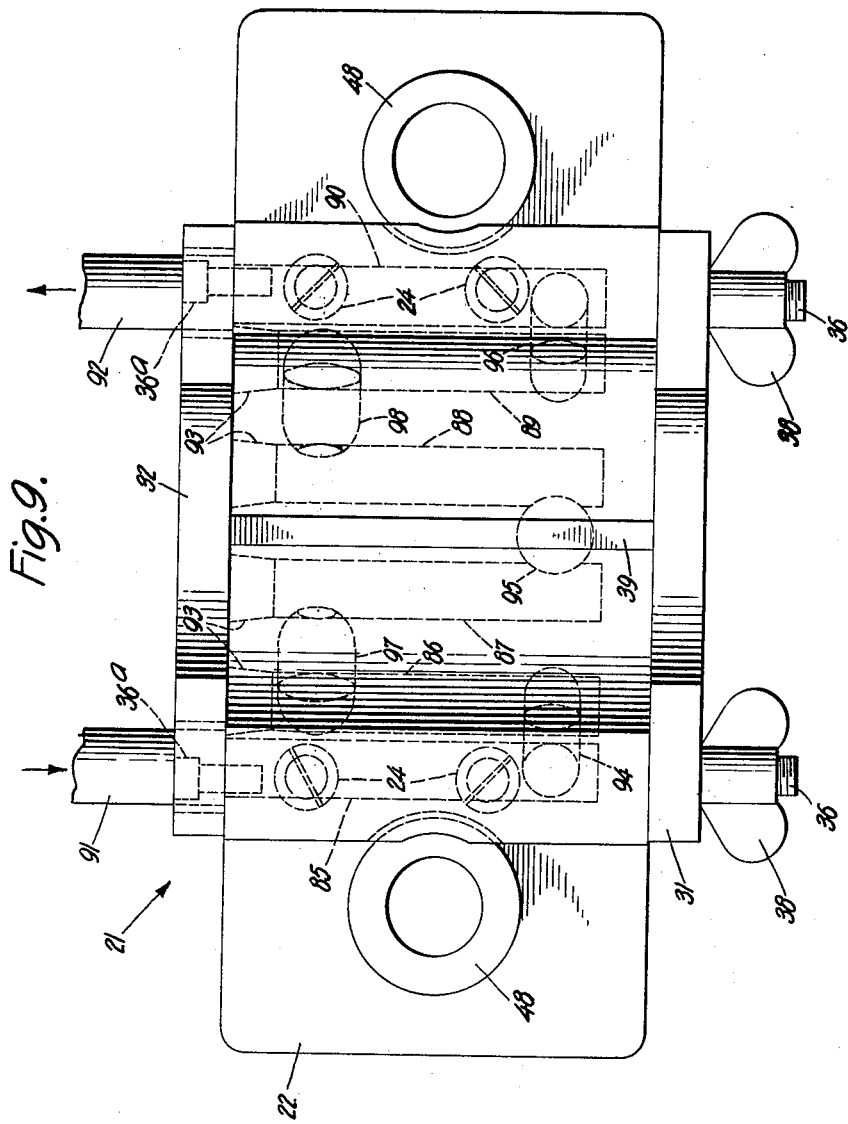

June 19, 1934.  C. A. FUCHS  1,963,126
MOLD FOR PRODUCING TYPE CARRIERS OR SHUTTLES FOR TYPEWRITING MACHINES
Filed Oct. 2, 1931   7 Sheets-Sheet 7
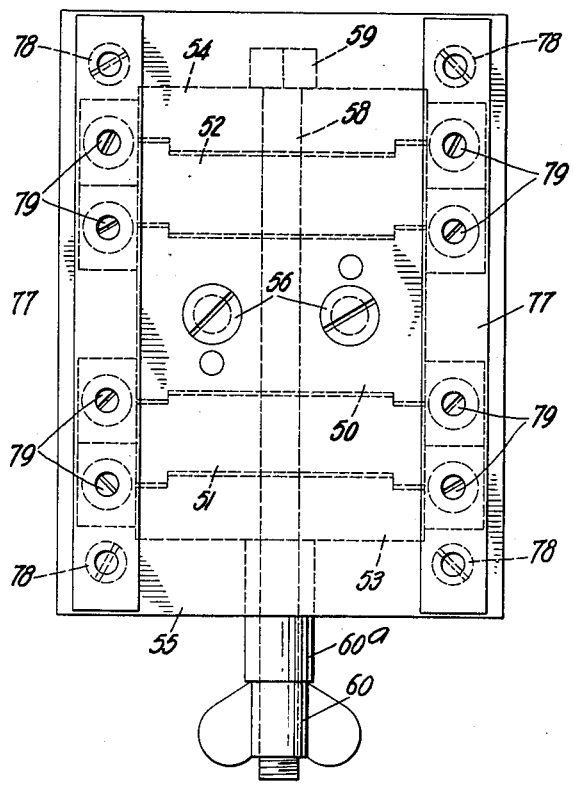
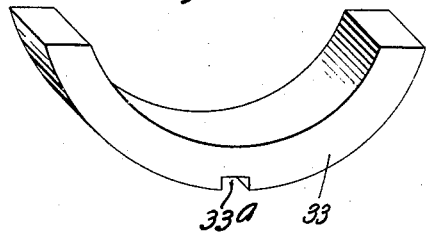
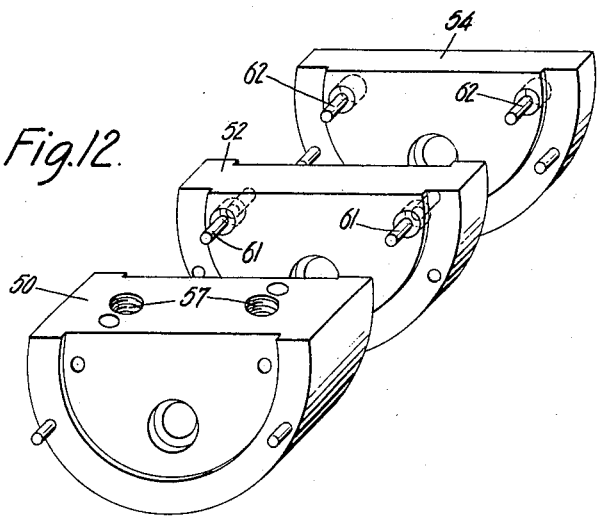
INVENTOR
Charles A. Fuchs.
BY John Waldheim
ATTORNEY Patented June 19, 1934

1,963,126

UNITED STATES PATENT OFFICE 1,963,126

MOLD FOR PRODUCING TYPE CARRIERS OR SHUTTLES FOR TYPEWRITING MACHINES

Charles A. Fuchs, Hollis, N. Y., assignor, by mesne assignments, to Ralph C. Coxhead Corporation, New York, N. Y., a corporation of Delaware Application October 2, 1931, Serial No. 566,402

35 Claims. (Cl. 18—17)

This invention relates to means of the method for producing type carriers or shuttles, for typewriting machines, of the kind illustrated in the applications of Charles A. Fuchs and Henry Resch, Serial Nos. 539,181 and 539,182 both filed May 22, 1931, in which the shuttle comprises a type segment, composed of phenolic condensation product such as bakelite or condensite, and a flange thereon whereby the shuttle may be actuated and guided.

The invention is also in the nature of improvements which may be used with the mold illustrated in my application, Serial No. 557,220 filed August 15, 1931, which includes one or more matrices, detachably supported on the base of the mold where they are properly located, and a ram comprising a head upon which are supported ram segments to fit into and to co-operate with the concaved matrices to mold the type segments of the shuttles.

The ram segments extend downwardly from the ram and they are supported thereon in a manner to enable the flange blanks, which subsequently form the actuating flanges of the shuttles, to be clamped between them and locate them properly transversely of the matrices.

The matrix holder of my above mentioned application has a plurality of cavities, shaped to conform with the curvature of the matrices, in which the matrices may be located and properly positioned with respect to ram segments or the flange segments to be held thereby.

After previously formed pellets, of powdered, uncured, bakelite or other suitable material, are placed in the matrices of the above mentioned mold it is heated until the pellets become plastic. The ram and the matrix holder are pressed together, in a suitable press, to flow the bakelite around in the space between the matrices and the ram segments to thus form the type segment of the shuttle. At the same time the protruding edges of the actuating segments are pressed into the type segments. The shuttles are then subjected to heat for a predetermined period, while the mold is closed, to cure them. After curing, the mold is cooled and it may then be opened to remove the type shuttles.

An object of the present invention is to provide a mold of the same general character as the one above mentioned but in which the parts are more accessible for convenience in operation and to expedite production of the type shuttles.

To this end the ram segments, instead of being mounted directly on the ram head, are supported on a plate or slide which is detachably mounted on the ram head so that it may be removed with the ram segments in order to more readily assemble thereon the segmental webs.

Provision is made to permit the matrices to be slid into the mold from one end thereof and means is provided at the entrance end of the mold whereby the matrices may be locked in position.

Another feature of the invention relates to the arrangement of two groups of ram segments located at opposite sides of an intermediate, fixed segment and a single bolt to co-operate with the whole gang of segments to draw them tightly together when clamping the web segments.

A further feature of the invention relates to means whereby the web segments, which may be of metal, are sprung so as to counteract the tendency to change the curvature of the type shuttle, which the type segment of the shuttle tends to produce, due to shrinking while cooling.

Still another feature of the invention relates to the arrangement and construction of the heating and cooling passages or ducts in the mold.

Other features and advantages will hereinafter appear.

In the drawings which form part of the specification,

Fig. 1 is an end elevation of the mold showing it closed between upper and lower pressure elements of a press;

Fig. 2 is a top plan view of the type shuttle;

Fig. 3 is a vertical section of the type shuttle taken on the line 3—3 of Fig. 2;

Fig. 4 is a vertical section taken on the line 4—4 of Fig. 1;

Fig. 5 is a detail view, on a larger scale, showing one of the ram segments and the web segment positioned thereon;

Fig. 9 is a top plan view of the matrix holder and illustrating the heating and cooling ducts therein;

Fig. 10 is a top plan view of the detachable slide which carries the ram segments;

Fig. 11 is a perspective view of a spacer to separate the groups of matrices in the matrix holder; and Fig. 12 is a scattered perspective view of one group of ram segments.

Similar reference characters represent similar parts throughout the several views.

Figure 6:
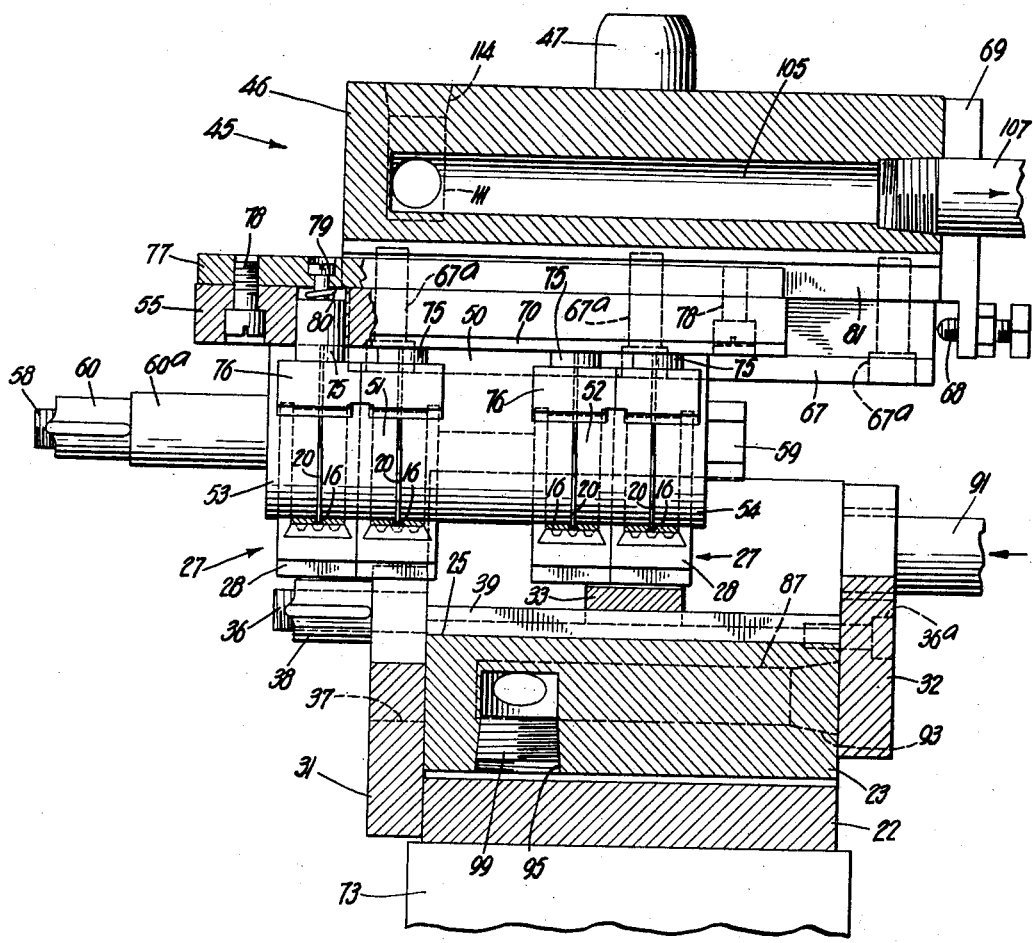
Fig. 6 is a sectional view similar to Fig. 4, but taken on the line 6—6 of Fig. 7, showing the mold parts separated as in Fig. 6.

The type shuttle 15 comprises a type segment 16 (Figs. 2 and 3) having three rows of types 17, 18 and 19 and a flange or flat segmental web 20.

The mold includes a matrix holder 21 comprising a base 22 on which is supported a block 23 (Figs. 1, 4, 7, and 9) secured to the base 22 by screws 24.

In the block 23 there is a concaved cavity or groove 25 (Figs. 1, 4, 6 and 7) extending from end to end thereof, in which are placed curved matrices 27, each matrix being composed of two sections 28 and 29 for convenience in removing from the shuttle after molding. Each matrix has three rows of types formed thereon in intaglio, corresponding to the rows of types 17, 18 and 19 of the type shuttles, and the matrices are arranged in two groups held in place by plates 31 and 32 and a spacer 33.

The plate 31 is mounted on the block 23 by bolts 36 extending from one end of the block through vertical slots 37, wing nuts 38 being threaded on the bolts 36 to secure the plate in its upper position, Figs. 1 and 4. The plate 31, after the wing nuts have been loosened, may be lowered, as in Fig. 6, to open the end of the cavity 25 so that the matrices may be readily assembled in the holder by sliding them into said holder from the open end. The matrices are arrested or located by the plate 32 which is permanently secured to the block 23 by screws 31a.

In the bottom of the cavity 25 there is provided a locator or bar 39, Figs. 6 and 7, seated in a groove 40 of the block 23, said locator serving as a rib to be engaged by shoulders 41 and 42 of the matrix sections 28 and 29, respectively, to position them circumferentially of the cavity 25 relatively to the segments 20 which are held in on a ram 45 of the mold in a manner hereinafter described.

The ram 45 of the mold includes a head 46 which is guided for movement to and away from the matrix holder by posts 47 secured to the base 22 and engaging in bushings 48 on the ram head. The posts 47 are of different diameters to prevent the ram from being incorrectly assembled on the base. The ram 45 further includes clamping elements or ram segments 50, 51, 52, 53 and 54, the central one 50 being located on a plate 55 by dowel pins 56a, and secured thereto by screws 56 passing through the plate and threaded into holes 57 of said segment (Figs. 4, 7 and 12). The segments 51, 53 are placed end to end at one side of the fixed segment 50 and the segments 52, 54 are also placed end to end but at the other side of the segment 50 so that the flat segments 20 may be clamped between them. The four segments 51, 52, 53 and 54 are supported on a bolt 58, passing through all of the segments, said bolt being supported by the fixed segment 50 and provided with a head 59 at one end and a wing nut 60 at the other end by which the segments may be clamped tightly together. A sleeve 60a is interposed between the wing nut and the segment 53 to locate the wing nut clear of the plate 55. The segments 51 and 52 are guided on the fixed segment 50 by pins 61 and the end segments 53 and 54 are guided on the segments 51 and 52 by guide pins 62.

The ram segments 50, 51, 52, 53 and 54 have springs 63 between them which spread the segments, when the wing nut 60 is loosened, so that the flange members 20 may then be inserted between said ram segments. The flange members are located circumferentially on the ram segments by stops or pins 63 as in Figs. 1, 5 and 7.

They are also placed against shoulders 65 for reasons hereinafter described. After the web segments 20 have been placed between the ram segments the latter may be drawn together, against the action of the spring 63, to grip said web segments, by tightening the nut 60 as above described. In tightening the nut 60 there is a tendency to rotate the bolt 58. This is prevented however by a pin 66 extending from the bolt 58 into a slot 66a in the end segment 54 (Fig. 4).

The slide 55, with the ram segments 50 to 54 thereon, is held on the ram head 46 by rails or tracks 67 secured to said ram head by screws 67a, so that it may readily be removed from the ram head by sliding it leftwardly as in Fig. 6 where said slide is shown partly removed. After removal, the slide may be inverted so that the segments extend upwardly therefrom in order that the web segments 20 may be readily assembled by dropping them between the ram segments. The web segments 20 are subsequently clamped, while the slide is in its inverted position, and the slide is then ready for assembling on the ram head, which is done by pushing it in from the left-hand end of the ram head. The slide is arrested by a stop screw 68 (Figs. 1, 4 and 6) adjustably supported on a bracket 69, secured to the ram head by screws 69a, to locate the web segments 20 properly transversely of the matrices 27.

As previously stated the guide posts 47 are of different diameters to prevent mounting it in a reversed position on the base of the mold. For a similar reason the slide is provided with a cutaway 70 to make one side thereof thinner than the other side so as to prevent assembling of the slide in a reversed position on the ram head 46.

After the segments 20 and the matrices have been properly located in the mold it is heated, in a manner hereinafter described, to render plastic a number of pellets 71 (Fig. 7) of uncured powdered bakelite previously inserted in the matrices. The ram 45 is then lowered by an upper jaw 72 of a high power press to press the protruding edges of the segments 20 into the plastic bakelite and to force the latter around in the channels formed by the matrices and the ram segments; the base 22 of the mold being supported on a fixed jaw 73 of the press. Dams 74 are provided at the ends of each matrix to form closures for the channels and thus prevent escape of the plastic material under pressure. While the material is under pressure the heating of the mold continues, for a period of time, to cure the material forming the type segment. The mold is then cooled, in a manner hereinafter described, and it is subsequently opened to remove the freshly molded shuttles 20.

The matrices 27 cling to the shuttles 15, after molding, and consequently they are lifted with the shuttles out of the cavity 25 of the matrix holder while the ram is being raised to open the mold, as in Fig. 6. The slide is then detached from the ram and turned upsidedown, thus rendering the matrices accessible for removal from the type shuttles 15 while they are still clamped by the ram segments or clamping elements 50 to 54, inclusive.

Figure 7:
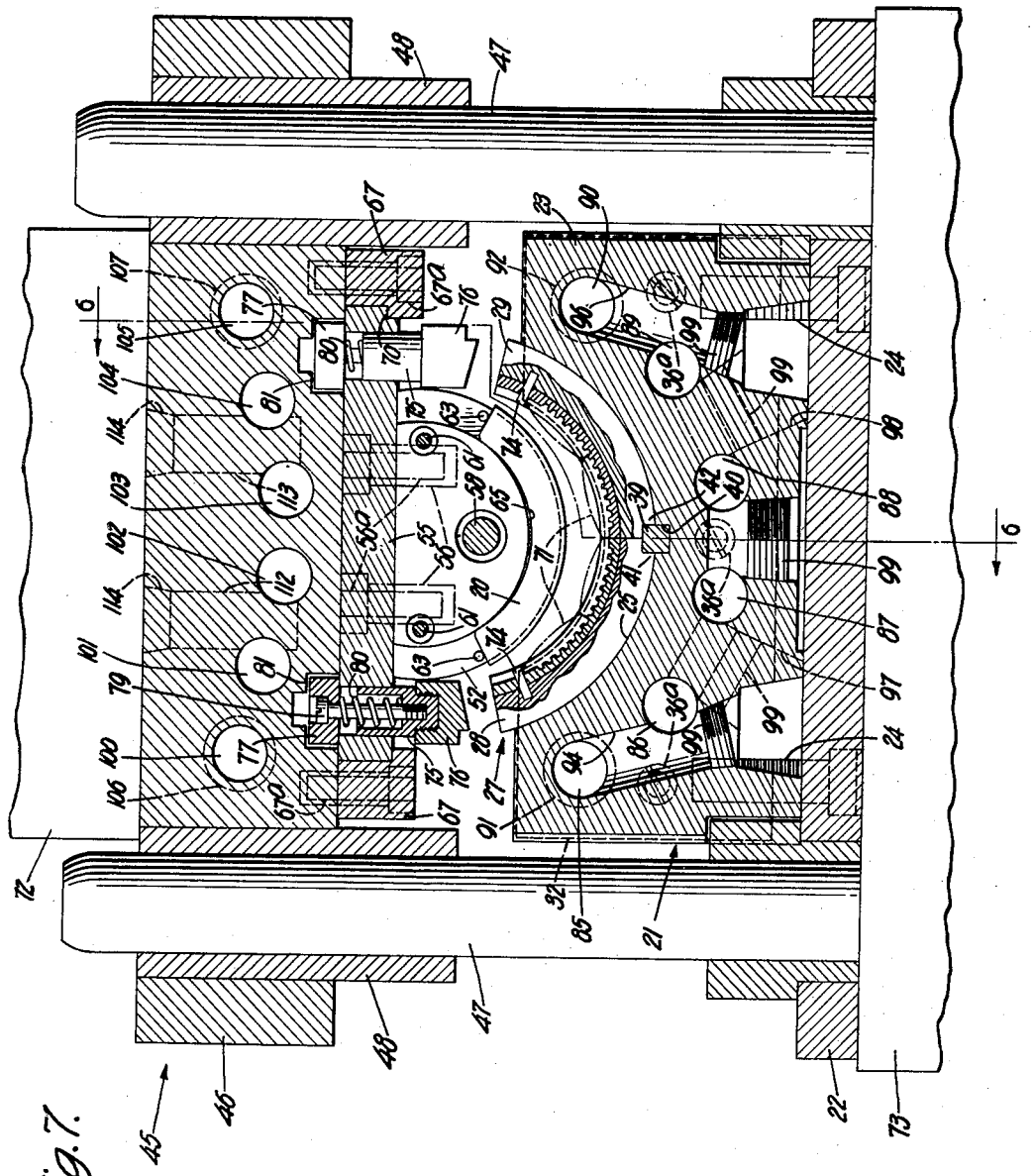
Fig. 7 is a sectional end view taken on the line 7—7 of Fig. 4 and showing the ram raised.

The matrix sections 28 and 29 are pressed towards each other and against the bar 39 to insure proper positioning thereof, as in my above mentioned application, by two gangs of plungers 75 having heads 76 which engage the opposite ends of the matrices (Figs. 6, 7 and 10). Associated with each set of plungers is a bar 77, secured to the slide 55 by screws 78 and on which the plungers are supported by screws 79. Springs 80 interposed between the bars 77 and the plungers press the plungers downwardly.

It is while the ram 45 is being lowered that the heads 76 engage the ends of the matrix sections 28 and 29 to press them towards each other, as above mentioned, to properly locate them against the bar or abutment 39. Said spring-pressed plungers are also effective to prevent spreading of the matrix sections 28 and 29 which may otherwise result while the plastic material is being pressed around in the arcuate channel formed by the matrix and the ram segments. Grooves 81, in the bottom of the ram head 46, provide clearance for the bars 77 and the heads of screws 79.

To heat and cool the mold the ram head and the matrix holder are provided with passages or ducts through which a suitable heating fluid or a cooling fluid may be circulated as required.

In the matrix holder fluid passages 85, 86, 87, 88, 89 and 90 (Figs. 6, 7 and 9) extend into the block 23 from the left end thereof, an inlet pipe 91 and an outlet pipe 92 being connected with the ends of the ducts 85 and 90, respectively, the ends of the other passages 86, 87, 88 and 89 being closed by plugs 93. The passages 85 and 86, 87 and 88, and 89 and 90 are connected in respective pairs by transversely extending holes 94, 95 and 96, at one end of the block 23, and the ducts 86 and 87, 88 and 89 are connected in respective pairs at the opposite end of the block by transversely extending holes 97 and 98. All of the holes 95 to 98 extend upwardly into the block 23 from the bottom thereof and their ends are closed by plugs 99. Thus the heating fluid or the cooling fluid is conducted into the matrix holder by the pipe 91 and then through passages 85, 94, 86, 97, 87, 95, 88, 98, 89, 96 and 90, the fluid leaving through pipe 92.

In the ram head 46 (Figs. 4, 6, 7 and 9) fluid passages 100, 101, 102, 103, 104, and 105 extend in from one end thereof similar to those in the matrix holder, the ducts 101 and 105 having connected thereto pipes 106 and 107, respectively, for the inlet and the outlet of the heating fluid or the cooling fluid. The other ducts, 101 to 104, inclusive, are closed at their ends by plugs 108. The passages 100 and 101, 102 and 103, and 104 and 105 are connected through holes 109, 110 and 111 extending downwardly into the head 46 from the top and near one end thereof. The passages 101 and 102 and the passages 103 and 104 are also connected by similar holes 112 and 113 extending downwardly from the top of the head 46 at the opposite end thereof. All of the holes 109 to 111 are closed by plugs 114.

Figure 8:
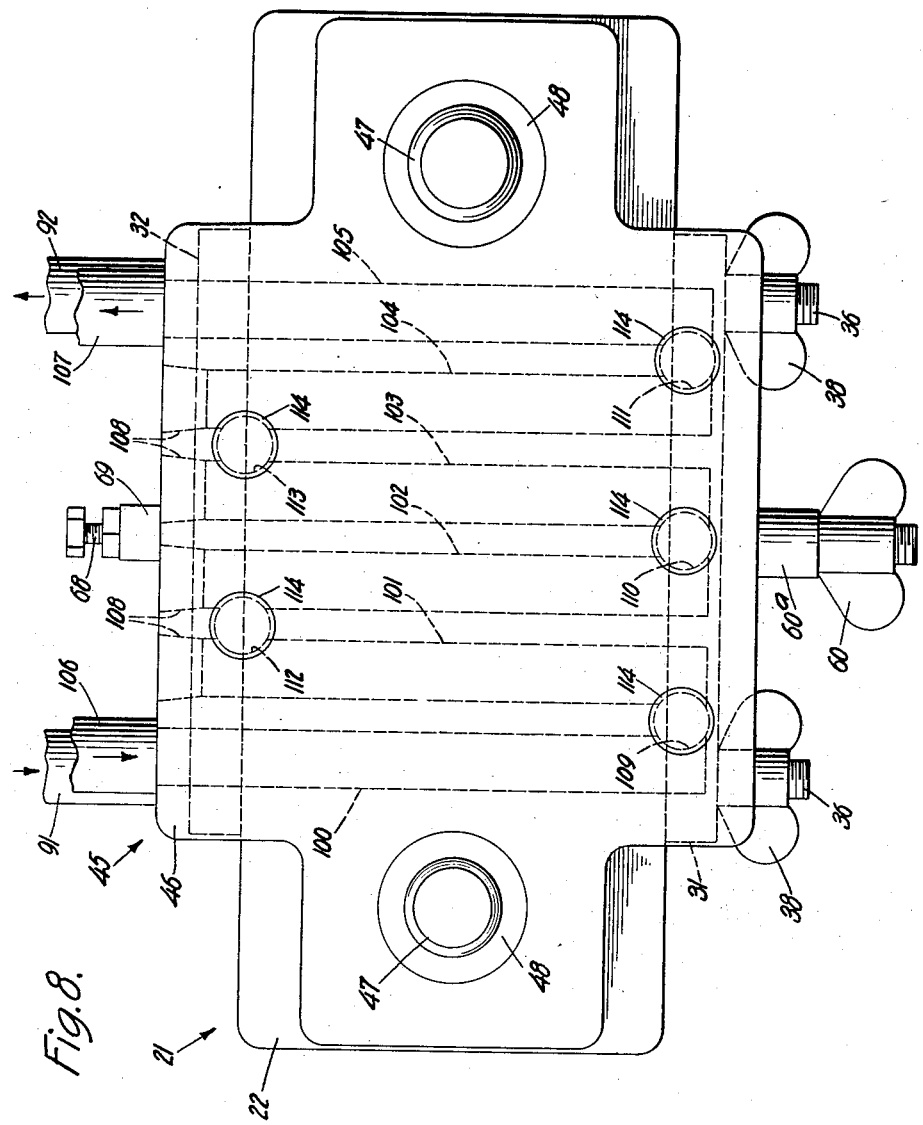
Fig. 8 is a top plan view of the mold, showing the heating and cooling ducts in the ram.

From the foregoing it will be understood that the heating fluid or the cooling fluid is conducted into the ram head by the pipe 101 (Fig. 8) through passages or ducts 100, 109, 101, 112, 102, 110, 103, 113, 104, 111, 105 and out from the ram through the pipe 107.

Suitable valves (not shown) may be inserted in the inlet pipes 91 (Fig. 9) and 101 (Fig. 8) whereby the steam may be cut off and a cooling fluid, such as water, admitted to flow through the passages in the mold. The mold parts through which the steam and water are conducted are composed of material such as steel so as to be water tight to prevent leakage of the fluid passed through the ducts therein.

It will be understood that the passages in the matrix holder are arranged in an arc about the matrices so as to be about equidistant therefrom and that the passages in the ram head are also located as close as possible to the matrices.

The mold may be operated in any suitable press, the base 22 of said mold being secured to the lower jaw or bed 73 in any suitable manner, and the ram head may be similarly secured to the upper jaw 72, which jaw may be the movable one to actuate the ram downwardly. As the head is moved upwardly to open the mold the matrices 27 are drawn out of the cavity 25, as indicated in Fig. 6, because they adhere to the freshly formed shuttles. The slide 55 is subsequently removed from the ram head for the removal of the shuttles as previously described.

Due to the fact that the web segment 20 is composed of metal such as German silver and the type segment 16 is composed of bakelite, there is a shrinkage of the type segment relatively to the web 20 in cooling. This shrinking of the type shuttle, although there is a slight slippage thereof on the web segment 20, tends to open the metal segment 20 and decrease its curvature which is objectionable.

To compensate for this shrinkage or, in other words, to counteract the tendency to change the shape of the shuttle, each metal segment is of slightly smaller radius than that of the shoulder 65 on each ram segment as in Fig. 5 where the condition is somewhat exaggerated. Accordingly, when the segment 20 is pressed into the plastic material in the matrix the metal segment is pushed thereby against the shoulder 65 and is sprung slightly to increase its radius to correspond with the radius of the shoulder 65. The type shuttle 15 is cooled while the metal segment 20 is in its sprung condition and the latter tends to spring back to its original shape, thus counteracting the tendency, produced by the shrinking of the type segment 16, to open said metal segment 20 and thus preventing the change of shape of the entire shuttle.

While certain preferred embodiments of the invention have been described, it will be understood that changes in the form, arrangements, proportions, sizes and details thereof may be made without departing from the scope of the invention as defined in the appended claims.

I claim:—

1. In a mold of the class described, the combination of a matrix holder having a cavity open at one end of said holder, matrices which may be slid into the cavity from the open end thereof, a ram head, a slide thereon, means on said slide to co-operate with the matrices to form channels therewith and to support web-like elements, means to position the matrices accurately on the holder, and means on the ram head to position the slide so that the web-like elements register properly with the matrices.

2. In a mold of the class described, the combination of a matrix holder having a cavity open at one end of said holder, matrices which may be slid into the cavity from the open end thereof, a ram head, devices on said ram to co-operate with said matrices to form channels therewith and to support web-like elements therebetween so that their edges extend into the channels when the latter are formed, means at one end of the cavity to locate the matrices with respect to the ends of the cavity, and means at the other end of the cavity to close said end thereof to prevent accidental endwise displacement of said matrices in said cavity.

3. In a mold for producing curved type shuttles each comprising a type segment and a flat segmental web thereon, the combination of a matrix holder comprising a single member having a concaved groove extending from one end to the other end thereof, segmental matrices to be placed in said groove, means at one end of the groove to locate the matrices axially of said groove, a rib in said groove to locate the matrices circumferentially of the groove, a ram head, detachable ram segments on the ram head to fit into the matrices and to form channels with the matrices, means to locate the ram segments with respect to the matrices in a direction axially of said groove, means whereby the segmental webs may be clamped between the ram segments, and means to guide the ram head relatively to the matrix holder.

4. In a mold for producing curved type shuttles each comprising a type segment and a flat segmental web thereon, the combination of a matrix holder having a concaved groove extending from end to end thereof, segmental matrices to be placed in said groove, means at one end of the groove to locate the matrices axially of said groove, a rib in said groove to locate the matrices circumferentially of the groove, a ram head, a slide supported on the ram head, ram segments carried by the slide and to fit into the matrices to form channels therewith, means whereby the segmental webs may be clamped between the ram segments, and means to guide the ram head relatively to the matrix holder.

5. In a mold for producing curved type shuttles, each comprising a type segment and a flat segmental web thereon, the combination of a matrix holder having a concaved groove extending from end to end thereof, segmental matrices to be placed in said groove, means at one end of the groove to locate the matrices axially of said groove, a rib in said groove to locate the matrices circumferentially of the groove, a ram head, a group of ram segments on said ram head, the group including a relatively fixed, central segment and a plurality of segments at each end of the central segment and supported for movement endwise thereof, means whereby the web segments may be clamped between the ram segments, and means to guide said ram relatively to said matrix holder, the ram segments co-operating with the matrices to form channels therewith in which the type segment is molded, the edges of the web flanges extending slightly beyond the faces of the ram segments to extend in the channels when the mold is closed.

6. In a mold for producing curved type shuttles, each comprising a type segment and a flat, segmental web thereon, the combination of a matrix holder having a concaved groove extending from end to end thereof, segmental matrices to be placed in said groove, means at one end of the groove to locate the matrices axially of said groove, a rib in said groove to locate the matrices circumferentially of the groove, a ram head, a slide on said ram head, a ram segment secured to said slide, a plurality of ram segments at each end of the fixed ram segment, a bolt extending through all of the ram segments whereby they may be drawn together to clamp web segments between them, means to locate the matrices on said holder, and adjustable means whereby the slide may be located on the ram head to properly position the web segments relatively to the matrices.

7. In a mold for producing a type shuttle comprising a type segment and a flat web segment thereon, the combination of a concaved matrix, a holder therefor, a ram head, a pair of segments on said ram head, means to draw said segments together to grip a flat web segment therebetween, said segments forming with the matrix a channel, means to actuate the ram to force material around in the channel and to force the edge of the flat segment into the material, and means to spring the flat segment so that the type segment may be molded thereto while said flat segment is in the sprung condition.

8. In a mold of the class described, the combination of a plurality of matrices, a holder therefor, a ram head, a plurality of ram elements on said head to co-operate with said matrices and between which pre-formed segmental webs may be gripped and located with respect to the matrices, and means whereby the ram head is detachably mounted on said holder, said means being also effective to prevent improper assemblage of the ram head on said holder and thus insure proper location of said webs with respect to said matrices.

9. In a mold of the class described, the combination of a plurality of matrices, a holder therefor, a ram head, a plurality of ram elements on said head to co-operate with said matrices and between which pre-formed segmental webs may be gripped and located with respect to the matrices, and two posts whereby the ram head is detachably supported on said holder, one of said posts being formed differently than the other post to prevent improper assemblage of the ram head on said holder and thus insure proper location of said webs with respect to said matrices.

10. In a mold of the class described, the combination of a plurality of matrices, a holder therefor, a ram head, a slide, ram elements to co-operate with the matrices supported on said slide, means to detachably support the slide on the ram head, said means being also effective to prevent improper assemblage of the slide on said head, and means to guide said ram head relatively to the holder.

11. In a mold of the class described, the combination of a plurality of matrices, a holder therefor, a ram head, a slide, ram elements to co-operate with the matrices supported on said slide, two guide ways on said ram head for said slide to detachably support the slide on the ram head, said slide being formed differently at one edge where it engages one of the guide ways than it is at the other end where it engages the other guide way, and means to guide said ram head on the matrix holder.

12. In a mold of the class described, the combination of a plurality of matrices, a holder therefor, a ram head, a slide, ram elements to co-operate with the matrices supported on said slide, two guide ways on said ram head for said slide to detachably support the slide on the ram head, said slide being formed differently at one edge where it engages one of the guide ways than it is at the other edge where it engages the other guide way, and two posts whereby the ram head is detachably mounted on the holder, one of said posts being formed differently than the other post to prevent improper assemblage of the ram head on the holder.

13. In a mold for producing a type shuttle comprising a type segment and a segmental flange thereon, the combination of a matrix, a holder therefor, means on said holder to accurately position the matrix on the holder, a ram, said ram including segments between which the flange segment may be held, a slide on the ram to support said segments to facilitate the assembling of the flange segments between the ram segments, and means to press the holder element and the ram elements together to press moldable material previously introduced into the matrix around in the curved duct formed by the matrix and the ram segments.

14. In a mold, the combination of a concaved matrix, said matrix having a groove in its concaved face, types formed in the bottom of the groove, a ram head, segments thereon having convexed surfaces adapted to co-operate with the matrix to form a closed channel, means to position the flat segment on the ram segments so that it protrudes slightly beyond the convexed faces of the ram segments and into the channel, means to clamp the ram segments together to grip a flat segment therebetween, means to press the ram against the matrix to force material in a plastic state around in said channel and to force the edge of the flat segment into the material, and a shoulder on one of the ram segments to engage behind the inner edge of the flat segment.

15. In a mold of the class described, the combination of a concaved matrix, a holder therefor, a ram head, ram segments having convexed faces adapted to co-operate with the matrix to form a closed channel, an arcuate shoulder on one of the ram segments to assist in locating the web segment properly between the ram segments, means to draw the ram segments together to grip the flat segment therebetween, and means to guide the ram head relatively to said holder.

16. In a mold for forming a type segment on a segmental web, the combination of a plurality of matrices, a holder therefor, the holder having an arcuate groove therein, each matrix being arcuate and each having types on its concaved face, all of the matrices fitting into said groove and being located side by side, each matrix comprising two sections placed end to end, a single locator extending from end to end of the holder to position all of the matrix sections circumferentially in the groove, a ram, a plurality of segments on the ram to form with the matrices a plurality of arcuate channels, means to locate the web segments on the ram segments circumferentially of the matrices, shoulders on some of the ram segments to cause the outer edges of the webs to extend slightly beyond the face of curved faces of the ram segments, means to move the ram against the matrices, and means to guide the ram relatively to the matrices.

17. In a mold for forming a curved type shuttle, the combination of a concaved matrix, a holder therefor, a ram head, ram segments thereon to co-operate with said matrix to form an arcuate channel, said ram and said holder having passages through which heating fluids and cooling fluids may be circulated for the purpose of first rendering plastic material placed in the matrix, the passages in the ram and the holder being formed by parallel holes extending in from one side, these holes being connected each with its next adjacent one by holes extending between the parallel holes and at right angles to a plane in which all of the parallel holes are located, and plugs to close the ends of all of the holes except two, one at each end of the outer ones of the parallel holes.

18. A mold to form a type segment on the edge of a segmental web, said mold including a plurality of concaved matrices placed side by side, a holder for said matrices, a ram head, a ram segment fixed to the ram head, a plurality of movable segments at each end of the fixed segment, a bolt extending through all of the ram segments whereby said segments may be drawn against each other to hold segmental webs therebetween, a projection on the bolt extending into one of the segments to prevent accidental rotation of the bolt, and springs between the ram segments tending to separate them.

19. In a mold for forming a type segment on a segmental web, the combination of a plurality of matrices, a holder therefor, the holder having an arcuate groove therein, each matrix being arcuate and each having types on its concaved face, all of the matrices fitting into said groove and being located side by side, each matrix comprising two sections placed end to end, a single locator to position all of the matrix sections circumferentially in the groove, a ram head, a slide on said ram head, a plurality of segments on said slide to form with the matrices a plurality of arcuate channels, means for clamping the webs between the ram segments, two gangs of plungers, one gang at each side of the matrices to engage the ends of the matrix sections to press them against said locator, a spring for each plunger to press it against the end of the matrix, the slide having apertures to house the plunger springs and the plungers extending through said apertures, a bar associated with each gang of plungers and secured to the slide to close the apertures and for said springs to act against, and means on each plunger to engage the associated bar to limit the movement of each plunger under the influence of the spring.

20. In a mold for producing curved type shuttles each comprising a type segment and a flat segmental web thereon, the combination of a matrix holder having a concaved, curved groove, segmental matrices extending transversely of said groove and placed end to end therein, a wall at one end of said groove to locate the matrices axially of said groove, a rib in said groove extending axially thereof to locate the matrices circumferentially of the groove, a ram, segments on said ram to fit into the matrices and to form channels with the matrices, a single bolt co-operating with all of the segments to clamp all of the segmental webs between said segments, and means to guide the ram relatively to the matrix holder, all of said segments except the end ones acting also as spacers to locate the segmental webs the proper distance from each other, and all of said segments serving to locate said segmental webs transversely of said matrices.

21. A mold to form type shuttles having each a type segment and a pre-formed segmental web thereon, said mold including a matrix, a holder therefor, a ram head, a ram segment fixed to said head, a bolt extending through the ram segment, a plurality of floating ram segments at each side of the fixed segment, said bolt extending through all of the segments, means to guide the ram segments relatively to each other, means on the ram segments to locate the web portions circumferentially thereof, shoulders on the segments against which the web segments may be placed, and a nut on said bolt whereby all of the floating segments may be drawn together against the fixed segment to clamp the segmental webs.

22. In a mold for making a type shuttle comprising a type segment and a thin pre-formed web segment extending therefrom, the combination of a matrix having a concaved face, said face having a groove extending in the direction of its curvature, types in the bottom of said groove, a segmental device to fit into the matrix to form therewith a closed channel, means whereby the web segment may be located on the segmental device so that its outer edge extends from said device, pressure means whereby plastic material may be forced around in said closed channel and against the edge of the web segment extending from said device, and a shoulder on said segmental device to engage the inner edge of said web segment to prevent inward movement of the latter while the pressure means is functioning.

23. A mold to form a type shuttle comprising a type segment and a thin pre-formed web segment thereon, said mold including a concaved matrix having flanges at its side edges, segmental devices to engage said flanges to form with said matrix a channel for the material forming the type segment, a support for the segmental devices, means to guide the support relatively to the matrix, means to clamp the web segment between the segmental device with its outer edge exposed so that said outer edge may be pressed into the material of the type segment, and means including an element whereby the segmental devices are removably mounted on said support to facilitate the mounting of the segmental web between the segmental devices.

24. A mold to form a type shuttle comprising a type segment and a thin pre-formed web segment thereon, said mold including a concaved matrix, and a segmental device to form therewith a channel for the material forming the type segment, a support for the segmental device, means to guide the support relatively to the matrix, means to clamp the flange member on the segmental device with its outer edge exposed, so that said outer edge may be pressed into the material of the type segment, means including an element whereby the segmental device is removably mounted on said support to facilitate the mounting of the segmental web on the segmental device, means to locate said element on said support to thus locate the segmental web transversely of the matrix, and means to prevent mounting of said element incorrectly on said support.

25. In a mold for making a type shuttle comprising a type segment and a thin segmental web thereon, the combination of a concaved matrix, a holder therefor, a segmental device to form therewith a closed duct, a ram, means to detachably support the segmental device on said ram, means whereby the segmental web may be located on the segmental device with its outer edge exposed, pressure means to force moldable material around in said channel to form the type segment on the exposed edge of the segmental web, said matrix being composed of two segmental sections placed together end to end, and means on the detachable support to prevent the spreading of the matrix sections while the pressure means is active.

26. In a mold for making a type shuttle comprising a type segment and a thin segmental web thereon, the combination of a concaved matrix, a holder therefor, two segments, a segmental device to form therewith a closed channel, a ram, a slide detachably supported on said ram, the two segments being supported on said slide for removal from the ram, means to locate the segmental web between the two segments so that the outer edge of the segmental web protrudes therefrom to extend into the closed channel, said matrix being composed of two segmental sections placed end to end in the direction of said channel, a holder for said matrix, means to cause said segmental device to co-operate with said matrix to press the moldable material around in said channel, dams in the opposite ends of the matrix and extending crosswise of the channel to determine the ends of the type segment, and means on said slide to prevent spreading of the matrix sections while the moldable material is being pressed.

27. In a mold for making a type shuttle comprising a type segment and a thin segmental web thereon, the combination of a concaved matrix, a detachable segmental device to form therewith a closed duct, means whereby the segmental web may be supported on the segmental device with its outer edge exposed, means to locate the segmental web circumferentially of the segmental device, means for positioning the matrix circumferentially of the segmental web, and means to position the detachable segmental device transversely of the matrix to locate the segmental web with respect thereto.

28. In a mold for making a type shuttle comprising a type segment and a thin segmental web thereon, said mold including a matrix, a holder therefor, a ram, two ram segments on said ram between which the segmental web may be inserted, means to detachably support said ram segments on said ram, said segments forming with the matrix a segmental duct to mold the type segment, means to draw said segments tightly towards each other to clamp the segmental web, and means to locate the supporting means on said ram to properly position the segmental web transversely of the matrix.

29. In a mold for making a plurality of type shuttles each comprising a type segment and a thin segmental web thereon, said mold including a plurality of matrices, a holder therefor, a ram, a stationary ram segment on said ram, a plurality of movable ram segments at each side of the stationary segment and between which segmental webs may be inserted, said ram segments forming with the matrices segmental ducts to mold the type segments, springs between said segment to separate them so that the segmental webs may be inserted between them, and means including a single bolt to support said springs and to clamp said ram segments together to grip said segmental webs.

30. A mold for forming a type segment on the edge of a pre-formed segmental web, said mold including a segmental concaved matrix, a ram, two ram segments on said ram between which the pre-formed segment may be clamped, a bolt to draw said segments together, a nut on said bolt, and means between the bolt and one of the ram segments to keep the bolt from turning while the nut is being rotated.

31. In a mold for producing a type shuttle comprising a pre-formed thin metallic segmental web, and a type segment molded on the edge thereof, the combination of means to hold the pre-formed web, means to mold the type segment on the outer edge of the pre-formed web, and means to spring the pre-formed web slightly to change its curvature and hold it in its altered condition while the type segment is being molded thereon.

32. In a mold of the class described, the combination of a holder, said holder having a groove extending endwise thereof, a plurality of matrices extending transversely of said groove and arranged side-by-side endwise of said groove, a ram head, a plurality of ram segments to cooperate with said matrices and also arranged side-by-side, means for detachably supporting the ram segments on the ram head so that they may be detached therefrom by movement in the axial direction of said groove while the ram segments are in close proximity to the matrices, means to locate said matrices axially of said groove, and means to locate the detachable supporting means to position the ram segments transversely of the matrices.

33. In a mold for producing segmental type carriers comprising each a type segment and a pre-formed thin segmental web thereon, the combination of a holder having a groove therein extending from end to end thereof, matrices arranged side-by-side lengthwise of said groove, said matrices extending transversely of said groove, a ram, segments on said ram to fit into the matrices to form therewith curved channels in which the type segments are molded, locating means at one end of the groove, the matrices being insertable into the groove from the opposite end of the groove and being positioned by the locating means, and a slide plate supported on said holder at the side of the mold from which the matrices are inserted to be moved vertically upward behind the last matrix to prevent accidental endwise movement of all of the matrices.

34. In a mold for producing segmental type carriers comprising each a type segment and a pre-formed thin segmental web thereon, the combination of a holder having a groove therein extending from end to end thereof, matrices arranged side-by-side lengthwise of said groove, said matrices extending transversely of said groove, a ram, segments on said ram to fit into the matrices to form therewith curved channels in which the type segments are molded, a plate secured to the holder at one side of said groove to form a shoulder against which the matrices may be arrested to properly locate them while being inserted into the groove from the opposite end thereof, a plate at the side of the groove from which the matrices are inserted to hold the matrices against accidental endwise displacement in said groove, means to support the last mentioned plate for movement to an obstructed position and to an unobstructed position relatively to said groove, and means to secure the movable plate in its effective position.

35. In a mold to form a plurality of type shuttles, each having a type segment and a pre-formed segmental web thereon, the combination of a holder having a groove extending from end to end thereof, matrices detachably supported in said groove, a ram head, a segment fixed on said ram head, a plurality of movable segments at each side of the fixed segment, means to draw all of the movable segments towards the fixed segment to clamp the pre-formed webs between them, all of said segments forming with the matrices curved channels to mold the type segments on the outer edge of the pre-formed webs, the matrices being inserted from one end of the groove in two groups axially of the groove, means at the opposite end of the groove to assist in positioning the matrices axially of the groove, a detachable spacer between the two groups of matrices and registering with the fixed ram segment, and operable means at the side of the groove from which the matrices are inserted to prevent accidental endwise movement of the matrices in the groove.

CHARLES A. FUCHS.